United States Patent [19]

Ohuchida et al.

[11] Patent Number: 4,935,911
[45] Date of Patent: Jun. 19, 1990

[54] OPTICAL HEAD DEVICE FOR RECORDING AND REPRODUCING INFORMATION

[75] Inventors: Shigeru Ohuchida, Zama; Toshiyuki Inokuchi, Yokohama; Nobuyuki Baba, Yokohama; Kazuhiro Fujita, Yokohama; Hideo Maeda, Yokohama, all of Japan

[73] Assignee: Ricoh Company, Ltd., Tokyo, Japan

[21] Appl. No.: 196,613

[22] Filed: May 20, 1988

[30] Foreign Application Priority Data

| May 20, 1987 | [JP] | Japan | 62-124718 |
| May 20, 1987 | [JP] | Japan | 62-124719 |
| May 20, 1987 | [JP] | Japan | 62-124720 |
| May 20, 1987 | [JP] | Japan | 62-76215 |

[51] Int. Cl.$^5$ .............................................. G11B 7/00
[52] U.S. Cl. .................................. 369/44.11; 369/13; 369/44.21; 360/144
[58] Field of Search .................................. 369/43-47, 369/109, 110, 112, 13; 250/201 DF; 358/342; 360/114

[56] References Cited

U.S. PATENT DOCUMENTS 4,733,065  3/1988  Hoshi et al. .................... 369/45 X

FOREIGN PATENT DOCUMENTS

| 58-130448 | 8/1983 | Japan . |
| 60-187937 | 9/1985 | Japan . |
| 61-265745 | 11/1986 | Japan . |
| 61-195534 | 12/1986 | Japan . |
| 62-26654 | 2/1987 | Japan . |
| 62-286549 | 4/1987 | Japan . |

OTHER PUBLICATIONS (47th Scientific Lecture of the Applied Physical Academy) p. 227; 9/27/86 "Analysis of Signal Reproduced from Optical Disc Using Method of Superposition of Wavefronts", Yukinori Okazaki, Ryoichi Imanaka and Yoshihiro Okino (30a-ZE-10).
(47th Scientific Lecture of the Applied Physical Academy) "Small-Sized Optical Head Using a Plurality of Functional Hologram Lenses" Yasuo Kimura, Yuzo Ono, Naruto Sugama and Yoshio Ohta (30P-ZE-1).
(47th Scientific Lecture of the Applied Physical Academy( "Method of Speerating and Detecting Beam with Low Cross Talk for Multibeam Optical Head using an Array of Semiconductor Laser" Masataka Itoh, Kenji Endo and Ohta (30P-ZE-2).
Nikkei Electronics 1986. 11. 3 No. 407 "Optical Head for Optical Disc using Hologram Device to Decrease the Number of Parts". pp. 86–87, Oct. 3, 1986, Kazuichi Tada and Kaoru Fushiki.
A Paper for the 22nd Lecture of the Scientific Research Society for Microoptics, pp. 38–44 Dec. 21, 1986.

Primary Examiner—Robert L. Richardson
Attorney, Agent, or Firm—Oblon, Spivak, McClelland, Maier & Neustadt

[57] ABSTRACT

An optical head device for recording and reproducing information includes beam splitting and converging mechanisms which has a first portion and a second portion secured to the first portion and is disposed on an optical path of light reflected from a photo-magnetic disk.

The first portion is adapted to split the reflected light received by the beam splitting and converging means into two beams which propagate in at least two directions different from each other and adapted to proportion the amount of reflected light in each of the two beams by means of the magnitude of the p-polarized component contained in the reflected light.

The second portion is adapted to converge separately the two split beams.

The converged two beams are used for reproducing binary data in the photo-magnetic disk.

9 Claims, 10 Drawing Sheets

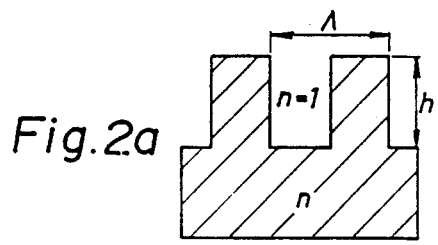
Fig.2a
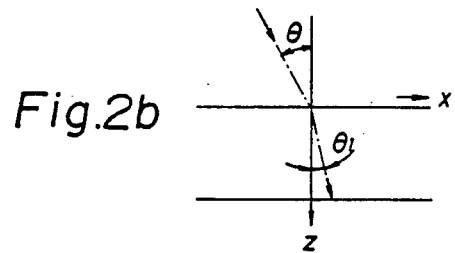
Fig.2b
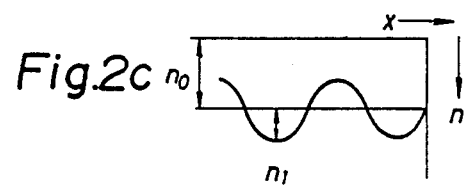
Fig.2c
Fig.3
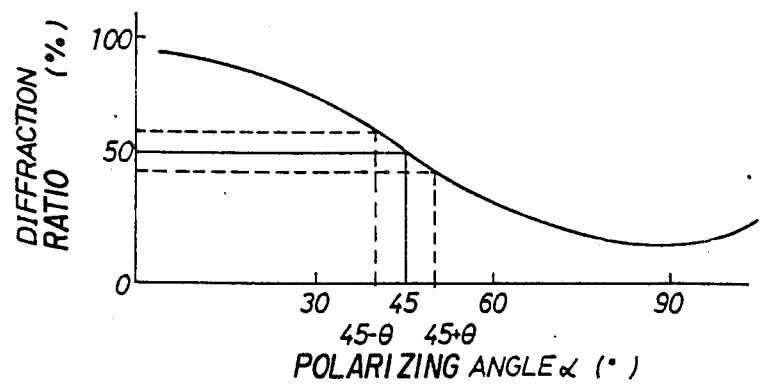

OPTICAL HEAD DEVICE FOR RECORDING AND REPRODUCING INFORMATION

BACKGROUND OF THE INVENTION

The present invention relates to an optical head device for recording and reproducing apparatus which writes information optically into an optical information recording medium such as a photo-magnetic disk and reads information from the medium.

A conventional optical head (optical pickup) which is capable of recording, reproducing and erasing information is composed of many components which takes much time to be positioned and aligned, and lacks in functional stability, which will be described in more detail later. Especially, a halfwave plate and a Wollaston prism, used to detect the direction of polarization of light require precise positioning.

It is therefore an object of the present invention to provide an optical head device for recording and reproducing information which is composed of a reduced number of components, eliminates the need of a halfwave plate and a Wollaston prism, and is compact and easy to assemble.

The above object of the present invention is achieved by an optical head device that can record and reproduce information, which includes a light source and a polarization beam splitter which transmits 100% of the p-polarized component of a light emitted from the light source and reflects the s-polarized component of the emitted light in a direction perpendicular to the optical path of the emitted light. The head device further includes an optical piece which directs the reflected s-polarized component upon a photomagnetic disk and directs the light reflected from the photomagnetic disk toward the polarization beam splitter. The light reflected from the disk contains both a p- and an s-polarized component. The head device also includes a beam splitter which receives the directed light reflected from the photomagnetic disk and splits it into two beams which propagate in directions different from one another. The beam splitter varies the intensities of the two split beams, the relative intensities being determined by the magnitude of the p-polarized component of the light received by the splitter. These two beams are then converged onto photo-detecting elements which are used to reproduce the binary data corresponding to information stored in the photomagnetic disk.

The above object of the present invention is also achieved by an optical head device that can record and reproduce information, which includes a light source, a polarization beam splitter that transmits 100% of the p-polarized component of a light emitted from the light source and reflects the s-polarized component of the emitted light in a direction perpendicular to the optical path of emitted light. An optical piece then reflects the reflected s-polarized component onto a photomagnetic disk and directs the light reflected from the disk toward the polarization beam splitter. The light reflected from the disk contains both a p- and s-polarized component. The light reflected from the disk is then split into two beams, the first beam propagating along the optical path of the directed light and the second beam propagating in a direction perpendicular to the first beam.

The beam splitter includes second portion for splitting the first beam into a third and fourth beam which propagate into different directions, the relative intensities of the third and fourth beams are determined by the magnitude of the p-polarized component of the first beam. The beam splitter is further adapted to converge the third and fourth beams onto photo-detecting elements which then are used to reproduce data corresponding to information stored in the photomagnetic disk.

The above and other features and advantages will be clarified from the following description of a preferred embodiment thereof when taken with reference to the drawings.

BRIEF DESCRIPTION OF THE DRAWINGS

FIGS. 2(a) through 2(c) and 3 illustrate the diffraction ratio of a phase type grating which constitutes the principles of the present invention.

DETAILED DESCRIPTION

Figure 1:
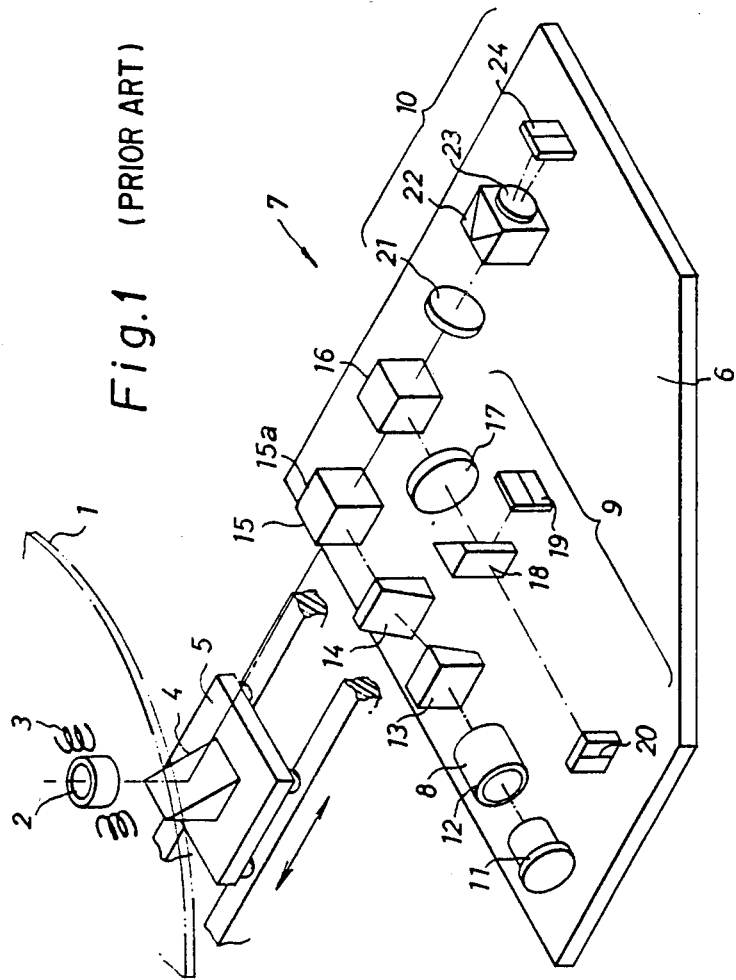
FIG. 1 is a perspective view of a conventional optical head device for recording and reproducing information.

First, a conventional optical head device will now be described with reference to FIG. 1. The head includes an objective lens 2 facing a photomagnetic disk 1, an objective actuator coil 3, a deflection prism 4, an optical system 5 movable in the directions of the arrow, and an optical system 7 fixed via a base plate 6 to the device. The optical system 7 includes an illumination optical system 8, a servo optical system 9 and a photo-magnetic detection optical system 10.

A laser beam emitted from a semiconductor laser 11 is collimated by a coupling lens 12, and shaped to have a circular cross section by beam shaping splitters 13 and 14. The shaped beam enters a polarization beam splitter 15 provided with a polarization plane 15a which transmits 100% of the p-polarized component and reflects ⅔ of the s-polarized component of the beam. Therefore only the s-polarized component is reflected by the polarization plane 15a and directed via the optical system 5 onto the photomagnetic disk 1.

A plane of polarization of the S-polarized component of the light reflected from the disk 1 is rotated clockwise or counterclockwise depending upon the direction of magnetization of the disk 1, that is, the state of binary information stored. Therefore, the beam reflected from disk 1 includes a p-polarized component. The reflected beam from the disk 1 is directed to the polarization beam splitters 15 and 16. The s-polarized component reflected by the polarized beam splitter 16, to the servo optical system 9 is received by a photo-detecting element 19 for tracking and a photo-detecting element 20 for focusing via a detection lens 17 and a knife edge prism 18 of the servo optical system 9. The s-polarized component transmitted through the splitters 15 and 16, and the p-polarized component produced by the rotation of the plane of polarization are inclined by 45° in the respective planes of polarization of the s-polarized and p-polarized components upon passing through a halfwave plate 21 of the photo-magnetic detection optical system 10, and then split into a p-polarized component and a s-polarized component by a Wollaston prism 22. These components are focused onto a photo-detecting element 24 by a detection lens 23. By detecting the respective components with the photo-detecting element 24, the direction of the polarization can be determined, making it possible to read binary data.

As described above, in the conventional optical head device, it is necessary to use a halfwave plate 21 and a Wollaston prism 22 to detect the direction of polarization of the reflected beam at the photo-magnetic detection optical system 10, which renders the structure of the head device complicated.

The diffraction ratio of a phase type grating which constitutes the principle of the present invention will now be described with reference to FIGS. 2 and 3.

In a grating having a large Bragg angle, the diffraction ratio for the p-polarized component differs from that for the s-polarized component. This will be now described in more detail.

Generally, the electric field E of a plane wave in a medium satisfies the following formula (1):

$$\nabla^2 E + \omega^2 \epsilon \mu E + \nabla \left( \frac{1}{\epsilon} \nabla \epsilon \cdot E \right) = 0 \quad (1)$$

Where $\omega$ is an angular velocity of the wave in the medium, $\epsilon$ and $\mu$ are the dielectric constant and magnetic permiability of the medium, respectively.

It is assumed here that the refractive index of a grating shown in FIG. 2(a) varies as shown in FIG. 2(c) and is represented by the following formulas (2):

$$n(x) = n_0 + n_1 \sin Kx \quad (2)$$
$$n_0 = (n + 1)/2$$
$$n_1 = 4(n - 1)/2\pi$$
$$K = 2\pi/\Lambda \text{ where } \Lambda \text{ is a pitch of the grating}$$

For the s-polarized component, $\nabla \epsilon \cdot E = 0$.

Therefore, the formula (1) may be changed as follows:

$$\nabla^2 E + n(x)^2 k_0^2 E = 0 \quad (3)$$

where $k_0 = 2\pi/\lambda_0$.

Also, the following formulas hold:

$$E(x, z) = \sum_{m=-\infty}^{\infty} \psi_m(z) \cdot e^{-jk'_m \cdot r} \quad (4)$$

$$k_{mx'} = n_0 k_0 \sin\theta_i + mk$$
$$k_{mz'} = n_0 k_0 \cos\theta_i$$

It is assumed that $n_1$ is small compared to $n_0$, and $\psi_m(z)$ varies slowly. Expand the formula (4), and you will get the following formula (5):

$$-j2K_{mz'}\psi_m' - k_{mz'}^2 \psi_m - k_{mx'}^2 \psi_m + (n_0^2 k_0^2 + \quad (5)$$
$$2n_0 n_1 k_0^2 \sin Kx)\psi_m \approx 0$$

If the incident angle $\theta_i$ is positive and there exist only the 0-order and -1-order light beams, the following relationship is obtained from the formula (5):

$$\psi_0' + \frac{n_1 k_0}{2\cos\theta_i} \psi_{-1} = 0 \quad (6)$$

$$\psi_{-1}' - \frac{n_1 k_0}{2\cos\theta_i} \psi_0 = j \frac{K^2 \left(1 - \frac{2n_0 n_1 k_0 \sin\theta_i}{K}\right)}{2n_0 k_0 \cos\theta_i} \psi_{-1}$$

If the following are set, $$\chi = n_1 k_0 / 2\cos\theta_i \quad (7)$$

$$Q = \frac{K^2 h}{n_0 k_0 \cos\theta_i} = 2\pi \frac{1}{n_0} \left(\frac{\lambda_0}{\Lambda}\right)^2 \frac{h}{\lambda_0} \frac{1}{\cos\theta_i}$$

$$\alpha = \frac{n_0 k_0 \sin\theta_i}{K} = \frac{n_0 \Lambda \sin\theta_i}{\lambda_0}$$

the following can be obtained:

$$\psi_{-1} = \frac{\chi h \sin\sigma}{\sigma} \quad (8)$$

$$4\sigma = [(Q(1 - 2\alpha))^2 + 4(2\chi h)^2]^{\frac{1}{2}}$$

The incident angle θ and the external diffraction ratio η are calculated by the following formulas (9):

$$\sin\theta = n_0\sin\theta_i \quad (9)$$
$$\eta = (1 - 2|rs|^2)(\chi h \sin\sigma/\sigma)^2$$
$$rs = (\theta - \theta_i)/\sin(\theta + \theta_i)$$

By analyzing a case of the p-polarized component similarly, diffraction ratios of the p- and s-polarized components can be obtained by the following formulas (10):

$$\chi s = \pi n_1/\lambda_0 \cos\theta_i \text{ (for the s-polarized component)} \quad (10)$$
$$\chi p = \chi s \cos 2\theta_i \text{ (for the p-polarized component)}$$

Therefore, it will be understood that if the Bragg angle $\theta_i$ is large, there is a significant difference in diffraction ratio between the s- and p-polarized components.

The diffraction ratio η' with respect to polarizing angle α of the incident light is given by $$\eta' = (\sin^2\chi sh - \sin^2\chi ph)\cos^2\alpha + \sin^2\chi ph \quad (11)$$

The relationship between the polarizing angle α and diffraction ratio η' represented by the formula (11) is shown by the graph in FIG. 3.

Figure 4:
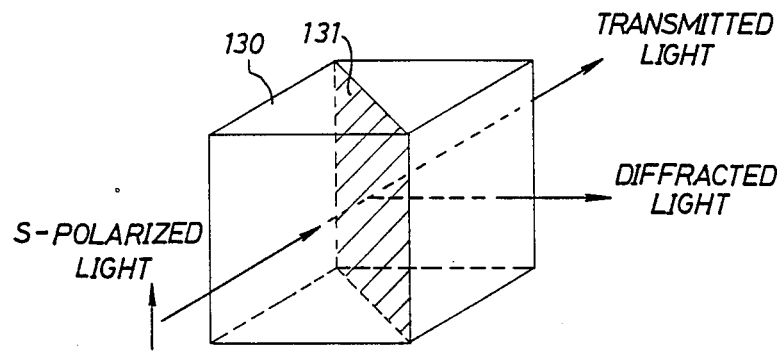
FIG. 4 is a schematic perspective view of a polarized beam splitting element of a first embodiment of the present invention.

A first embodiment of this invention will now be described in more detail with reference to FIGS. 4-9. In the embodiment, a polarization beam splitting element 130 shown in FIG. 4 is used instead of the polarization beam splitter 16 of FIG. 1. The element 130 splits the reflected light from the photo-magnetic disk into transmitted light and diffracted light components which propagate in directions perpendicular to one another. The element 130 includes two prisms joined with a linear diffraction grating 131 sandwiched between the two joined faces and positioned such that the diffraction grating 131 forms an angle of 45° with respect to plane of polarization of the s-polarized component.

Figure 5:
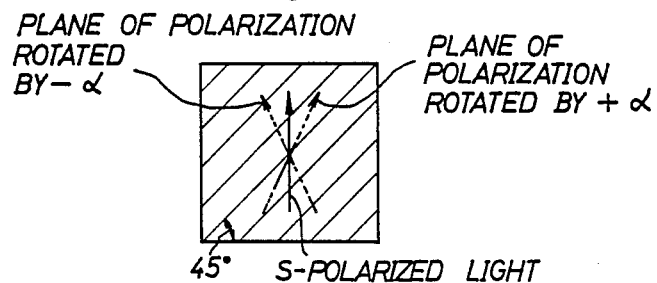
FIG. 5 is a front view of a diffraction grating.
Figure 6:
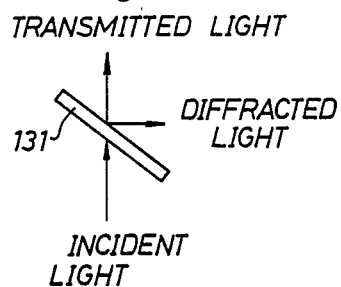
FIG. 6 is a plan view of the diffraction grating.

The light reflected by the photo-magnetic disk and passing through the element 130 enters the diffraction grating 131 as shown in FIGS. 4 and 5. The light entering the grating 131 is divided by the grating 131 into a transmitted light component rectilinearly propagating and a diffracted light component propagating in a direction perpendicular to the transmitted light component. The diffracted light from the diffraction grating 131 is led into the optical detector of the servo optical system, while the transmitted light is led to the optical detector of the photo-magnetic detection optical system. Thus an information signal, a tracking signal and a focusing signal can be detected. The plane of polarization of the reflected light from the photo-magnetic disk 1 is rotated by an angle of +α or −α relative to the plane of polarization of the s-polarized component (vertical plane) in accordance with the existence of a recorded signal. Therefore, as will be understood in FIG. 5, the intensities of the transmitted light and the diffracted light vary in accordance with the direction of rotation of the plane of polarization of the reflected light. This will now be described in more detail with reference to FIG. 3. If only the s-polarized component enters the diffraction grating 131 and the polarized angle is 45°, the diffraction ratio η is 50%. If the plane of polarization is rotated by an angle of +α and the polarized angle becomes 45°+Δθ, the diffraction ratio η becomes (50−a) %, so that (50−a) % of the light is diffracted by the diffraction grating 131 and the remaining (50+a) % of the light passes through the grating. If the plane of polarization is rotated by and angle of −α and the polarized angle becomes 45°−Δθ, the diffraction ratio η becomes (50+a) %, so that (50+a) % of the light is diffracted by the diffraction grating 131 and remaining (50−a) % of the light is transmitted. As described above, since the intensities of the transmitted light and the diffracted light vary in accordance with their directions of polarization, the direction of polarization can be detected, that is, the recorded information can be read. Since the direction of the diffraction grating 131 is inclined by 45°, it is unnecessary to incline the planes of polarization of the light by 45° with a halfwave plate as in the prior art.

Figure 7A:
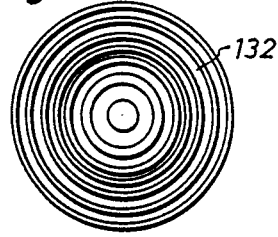
FIG. 7(a) is a front view of a concentric-circular converging diffraction grating of surface relief type.
Figure 8A:
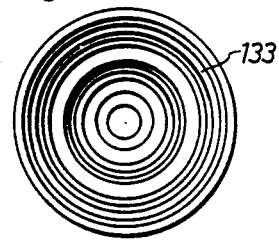
FIG. 8(a) is a front view of a concentric-circle shaped converging diffraction grating of Fresnel lens type.
Figure 7B:
FIG. 7(b) is a cross section view of the grating.
Figure 8B:
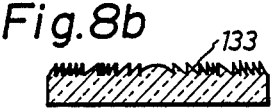
FIG. 8(b) is a cross section view of the grating of FIG. 8(a).
Figure 9A:
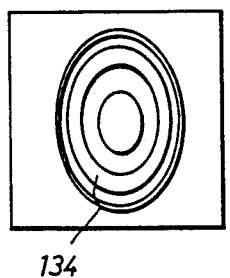
FIG. 9(a) is a front view of a concentric-oval shaped converging diffraction grating of surface relief type.
Figure 9B:
FIG. 9(b) is a cross section view of the grating of FIG. 9(a).
Figure 10A:
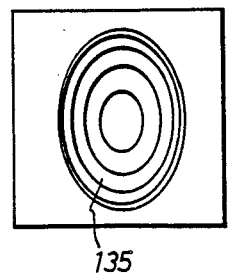
FIG. 10(a) is a front view of a concentric-oval shaped converging diffraction grating of Fresnel lens type.
Figure 10B:
FIG. 10(b) is a cross section view of the converging diffraction grating of FIG. 10(a).

In order to detect the focusing signal and tracking signal, the transmitted light and the diffracted light emerging from the splitting element 130 must be converged before being led to the light detector. In this embodiment, any one of converging diffraction gratings 132-135 illustrated in FIGS. 7-10, is used instead of a conventional converging lens such as the detection lens 23 of FIG. 1. The diffraction grating 132 of FIG. 7 is a concentric-circle converging diffraction grating of surface relief type and the grating 133 of FIG. 8 is a concentric-circle shaped converging diffraction grating of Fresnel lens type. The diffraction grating 134 of FIG. 9 is a concentric-oval shaped converging diffraction grating of surface relief type, and the grating 135 of FIG. 10 is a concentric-oval shaped converging diffraction grating of Fresnel lens type. The grating 134 or 135 serves to detect a focusing signal by an astigmatic process.

Figure 11:
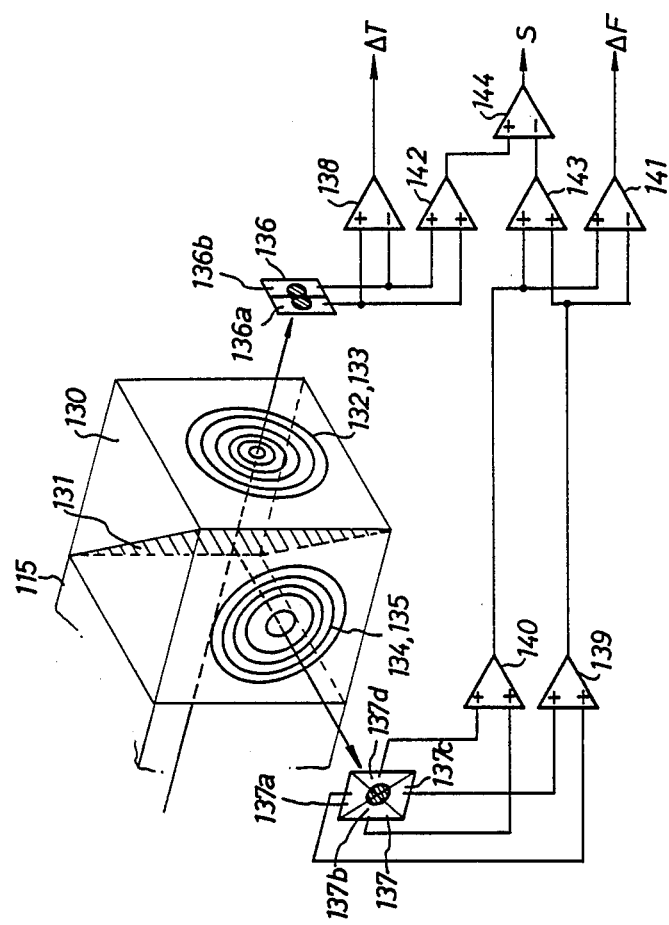
FIG. 11 is a perspective view of an optical detecting system of the first embodiment.

When any one of gratings 132-135 is used, the detection optical system after the polarization beam splitting element 130 may be constituted as shown in FIG. 11. The optical detection system shown in FIG. 11 includes a tracking optical system and a focusing optical system.

The operation of the optical detection system thus constructed will now be described. Since the concentric-circle shaped converging diffraction grating 132 or 133 is formed integrally with a surface of the element 130, from which the transmitted light emerges, the transmitted light is converged by the diffraction grating 132 or 133 onto a dual-divided photodetector 136 having two photodetecting elements 136a and 136b. Furthermore, since the concentric-oval shaped converging diffraction grating 134 or 135 is also formed integrally with another surface of the element 130, from which the diffracted light emerges, the diffracted light is converged by the diffraction grating 134 or 135 onto a quad-divided photodetector 137 including four photodetecting elements 137a, 137b, 137c and 137d. The difference between two output signals from the photodetecting elements 136a and 136b is calculated by a differential amplifier 138 to provide a tracking signal ΔT by a so-called push-pull process. On the other hand, the sum of the output signals from the photodetecting elements 137a and 137c and the sum of the output signals from the photodetecting elements 137b and 137d are calculated by the corresponding operational amplifiers 139 and 140, and the difference between two output signals from the amplifiers 139 and 140 is calculated by a differential amplifier 141 to provide a focusing signal ΔF by a so-called astigmatic process. An information signal S is obtained by calculating the difference between output signals from the photodetectors 136 and 137.

Figure 12:
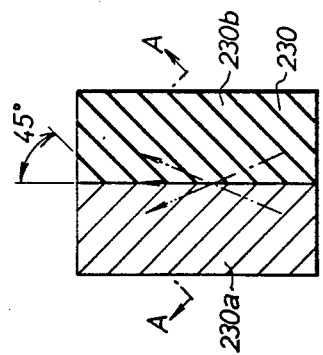
FIG. 12 is an elevation view of a dual-divided diffraction grating of a second embodiment of the present invention.
Figure 13:
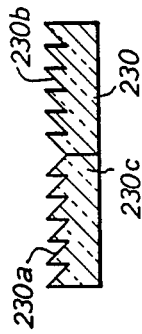
FIG. 13 is a cross section view taken along the line A—A of FIG. 12.

A second embodiment of the present invention will now be described with reference to FIGS. 12-15. In the particular embodiment, a dual-divided diffraction grating 230 shown in FIG. 12 is disposed in the optical path of a photo-magnetic detection optical system 7 in FIG. 1 (namely, in the path of the light reflected from the photo-magnetic disk 1) instead of the halfwave plate 21 and Wollaston prism 22. As shown in FIGS. 12 and 13, the dual-divided diffraction grating 230 includes two diffraction grating elements 230a and 230b formed symmetrically with each other on a grating substrate 230c. As shown in FIG. 13, each of the cross sections of these grating elements 230a and 230b has the configuration of saw-teeth, each of which has a 45° inclination with respect to the substrate 230 and the plane of polarization of the s-polarized component of the reflected light beam.

The light reflected by the photo-magnetic disk and passing through the polarization beam splitter enters to the dual-divided diffraction grating 230. As will be understood from the characteristic shown in FIG. 3, one of the grating elements 230a and 230b provides a diffraction ratio increased by a quantity determined by the magnitude of the p-polarized component contained in the reflected light. On the contrary, the other grating element provides a diffraction ratio reduced by a corresponding quantity. Thus if a difference between both diffraction ratios is detected, the direction of polarization can be detected with high sensitivity without using the halfwave plate.

Figure 14A:
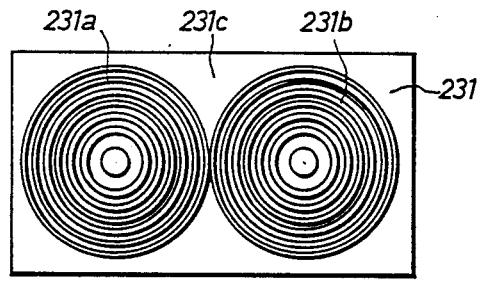
FIG. 14(a) is a front view of a hololens.
Figure 14B:
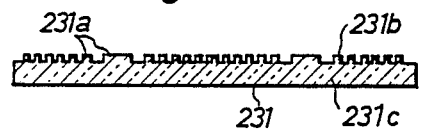
FIG. 14(b) is a cross section view of the hololens of FIG. 14(a).

The use of a hololens 231 shown in FIG. 14 instead of the detection lens 23 of FIG. 1 serves to reduce the weight of the whole device. The hololens 231 includes elements 231a and 231b formed on substrate 231c, which correspond respectively to the aforementioned diffraction grating elements 230a and 230b.

Figure 15:
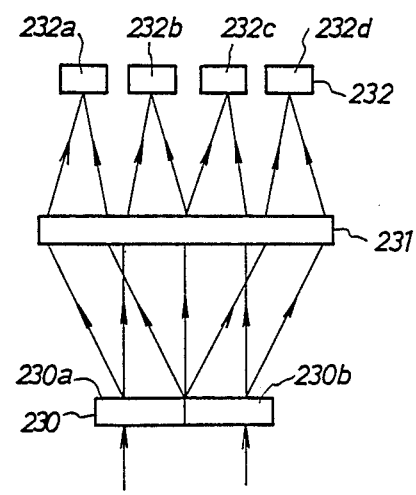
FIG. 15 is a plan view of an optical detecting system of the second embodiment of the present invention.

For the quad-divided photodetector 232, photodetecting elements 232a, 232b, 232c and 232d are used as shown in FIG. 15. If the respective output signals from the photodetecting elements 232a, 232b, 232c and 232d are represented by a, b, c and d, respectively, the binary information signal to be detected is obtained by determining whether the value (d−a)+(b−c) is positive or negative.

Figure 16:
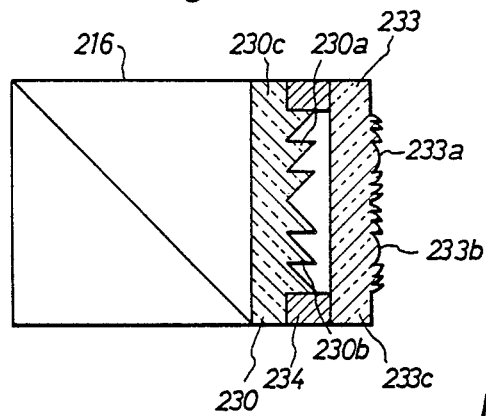
FIGS. 16 and 17 are cross section views of modification of the second embodiment.

A modification of the second embodiment will now be described with reference to FIGS. 16-18. In the particular modification, the dual-divided diffraction grating 230 is fixed integrally to a polarization beam splitter 216, and a Fresnel lens 233 is integrally fixed as a converging diffraction grating to the grating 230 through a spacer 234. In the particular modification, Fresnel lenses 233a and 233b are used as converging diffraction gratings, as shown in FIG. 16. (The hololens 231 of FIG. 14 may be used instead of Fresnel lens 233.)

Figure 17:
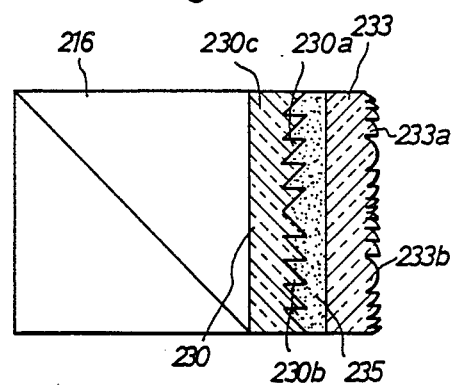

As shown in FIG. 17, the dual divided diffraction grating 230 and Fresnel lens 233 may be formed with an optically transparent adhesive 235 instead of the spacer 234.

Figure 18:
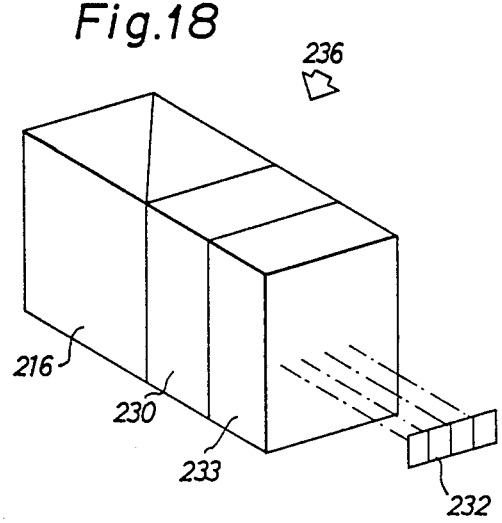
FIG. 18 is a perspective view of the optical detecting system of the modification.

FIG. 18 shows the photomagnetic detection optical system including the polarized beam splitter 216, dual-divided diffraction grating 230 and Fresnel lens 233 which are formed as one piece as mentioned above.

Figure 19A:
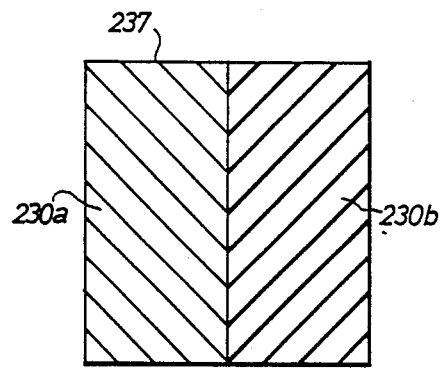
FIGS. 19(a) and (b) are front views of another modification of the second embodiment.
Figure 19B:
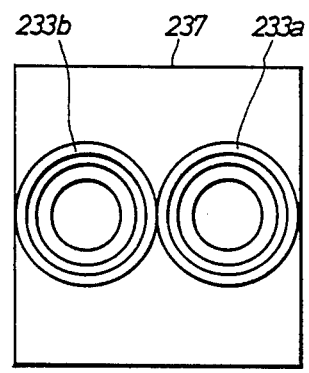

Another modification of the second embodiment will now be described with reference to FIGS. 19-23. In the particular modification, as shown in FIG. 19(a), diffraction gratings 230a and 230b corresponding to those shown in FIG. 12 are formed on one face of substrate 237, on the other face of which are formed Fresnel lenses 233a and 233b corresponding to those shown in FIG. 16. The unification of the diffraction gratings 230a, 230b and Fresnel lenses 233a and 233b on the substrate 237 is accomplished, for example, by coating both sides of the substrate 237 with photoresist and then exposing these coated surfaces to light. According to the above-mentioned structure, the conventional halfwave plate, Wollaston prism and detection lens are integrated into a single component.

Figure 20:
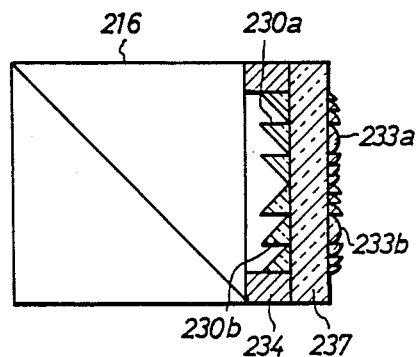
FIGS. 20 and 21 are cross section views of the modification of the second embodiment.
Figure 21:
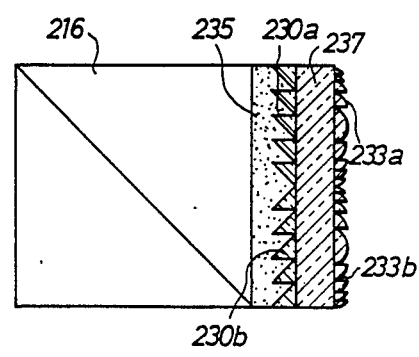

As shown in FIG. 20, the spacer 234 may be interposed between the polarization beam splitter and substrate 237 so as to join the beam splitter and substrate 237 according to FIG. 16. Alternatively, as shown in FIG. 21, the beam splitter and substrate may be unified with an optically transparent adhesive 235 as shown in FIG. 17.

Figure 22:
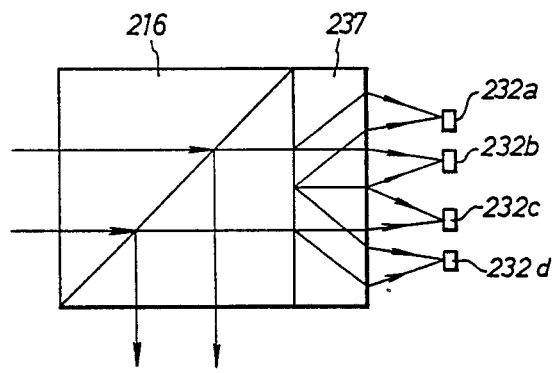
FIGS. 22 and 23 are respectively a plan view and a perspective view of the optical detecting system of the modification of the second embodiment.
Figure 23:
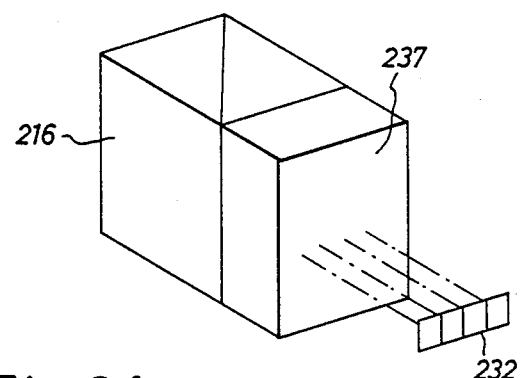

FIGS. 22 and 23 are a plan view and a perspective view of the detection optical system of the particular modification, respectively. As apparent from the above discussion, the only components of the photo-magnetic detection optical system 236 which are required to be aligned with reference to the optical axis the single optical component and the photodetection elements 232.

Figure 24:
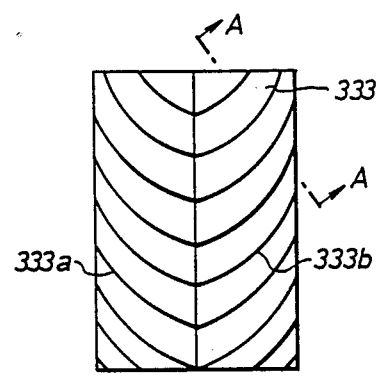
FIG. 24 is an elevation view of a polarized beam splitting and converging element of a third embodiment of the present invention.
Figure 25:
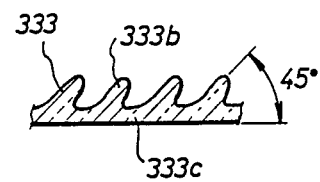
FIG. 25 is a cross section view taken along the line A—A of FIG. 24.

A third embodiment of this invention will now be described with reference to FIGS. 24-27. In the particular embodiment, the polarization beam splitting and converging element 333 shown in FIG. 24 is disposed in the optical path of the photo-magnetic detection optical system 7 shown in FIG. 1 (namely, in the optical path of the light reflected from the photo-magnetic disk 1) instead of the halfwave plate 21 and Wollaston prism 22. The element 333 includes a hololens attached to a dual-divided diffraction grating described in the first modification of the second embodiment. It is to be noted, as shown in FIG. 24, that the shape of the gratings 333a and 333b are not linear, but curved, as in a hololens, so as to have a converging characteristic. The diffraction gratings 333a and 333b are symmetrical about the center line of the element 333. The polarization beam splitter and converging element 333 are such that the diffraction ratio of the gratings 333a and 333b are the same. The cross section of these gratings 333a and 333b take the form of saw-teeth, each of which has a 45° inclination, as shown in FIG. 25.

Figure 26:
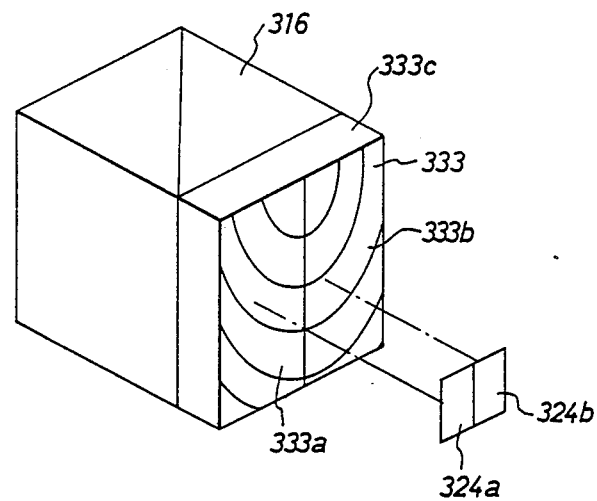
FIG. 26 is a perspective view of an optical detecting system.
Figure 27:
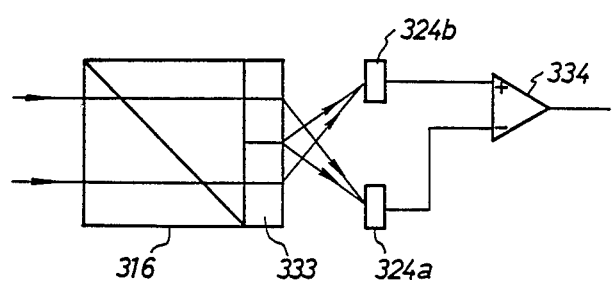
FIG. 27 is a plan view of the optical detecting system of FIG. 26.

As shown in FIGS. 26 and 27, the photodetector 324 includes dual-divided photodetecting elements 324a and 324b. The difference between the output signals from the elements 324a and 324b is provided as a reproduced signal through a differential amplifier 334.

The element 333 may be formed joined to beam splitter 316 by an optically transparent adhesive, as shown in FIGS. 26 and 27.

As described above, an optical head device recording and reproducing information according to the present invention includes a smaller number of components as compared to the prior art device, so that the time required for aligning the components is reduced and the changes in characteristics of the device over time can be reduced.

While the present invention has been described with reference to preferred embodiments, various changes and modifications would be possible to those skilled in the art without departing from the scope of this invention.

We claim:
1. An optical head device for recording and reproducing information, comprising:

a light source;

a polarization beam splitter for transmitting 100% of a p-polarized component of a light emitted from said light source and for reflecting an s-polarized component of said emitted light in a direction perpendicular to an optical path of said emitted light;

means for reflecting said reflected s-polarized component upon a photo-magnetic disk and for directing a light reflected from said photo-magnetic disk toward said polarization beam splitter, said light reflected from said disk comprising a p-polarized component and an s-polarized component;

beam splitting means disposed on an optical path of said directed light for receiving said directed light, and for splitting said received light into two beams which propagate in at least two directions different from each other and for increasing the intensity of the first of said two beams and at the same time decreasing the intensity of the second of said two beams, the intensity of each of the said two beams determined by the magnitude of said p-polarized component of said received light;

first converging means for converging said first of said two beams;

second converging means for converging said second of said two beams; and reproducing means for reproducing binary data corresponding to information in said photo-magnetic disk, said reproducing means using the relative intensities of said first and second converged beams.

2. An optical head device according to claim 1, in which said beam splitting means comprises diffraction grating means including two rectangular prisms, and a diffraction grating secured between joined faces of said two prisms, said diffraction grating having linear gratings which are inclined by 45° with respect to a plane of polarization of said s-polarized component of said received light normally entering an exposed face of the first of said two rectangular prisms, and said diffraction grating means for splitting said received light entering said diffraction grating into a first beam propagating along said optical path of said received light and a second beam propagating in a direction perpendicular to said optical path of said received light;

said first converging means is disposed on an exposed face of the second of said two rectangular prisms for converging said first beam, said second converging means is disposed on the other exposed face of said second rectangular prism for converging said second beam, said optical head device further comprising means for producing a tracking signal using said first converged beam and means for producing a focusing signal using said second converged beam.

3. An optical head device according to claim 2, in which said first converging means comprises a concentric-circle shaped diffraction grating of surface relief type.

4. An optical head device according to claim 2, in which said second converging means comprises a concentric-oval-shaped diffraction grating of Fresnel lens type.

5. An optical head device according to claim 1, in which said beam splitting means comprises:

a second polarization beam splitter disposed on said optical path of said directed light for receiving said directed light and for splitting said received light into a first beam to propagate along an optical path of said received light and a second beam to be directed to a direction perpendicular to said optical path of said received light; and a beam splitting diffraction grating attached on a surface, from which said first beam emerges, of said second polarization beam splitter for splitting said first beam into a third beam and a fourth beam both of which propagate respectively in directions different from each other, said beam splitting diffraction grating comprising two diffraction gratings arranged adjacent to each other on said surface, and both inclined in linear gratings thereof by 45° with respect to a plane of polarization of said s-polarized component of said received light, said linear gratings of said two diffraction gratings being perpendicular to each other;

said first converging means disposed on one of said two diffraction gratings for converging said third beam, and said second converging means disposed on the other of said two diffraction gratings for converging said fourth beam.

6. An optical head device according to claim 5, in which each of said first converging means and said second converging means comprises a hololens.

7. An optical head device according to claim 5, in which each of said first converging means and said second converging means comprises a Fresnel lens.

8. An optical head device for recording and reproducing information, comprising:

a light source;

a polarization beam splitter for transmitting 100% of a p-polarized component of a light emitted from said light source and for reflecting an s-polarized component of said emitted light in a direction perpendicular to an optical path of said emitted light;

means for reflecting said reflected s-polarized component upon a photo-magnetic disk and for directing a light reflected from said photo-magnetic disk toward said polarization beam splitter, said light reflected from said disk comprising a p-polarized component and an s-polarized component;

beam splitting means and converging means comprising a first portion and a second portion secured to said first portion and disposed on an optical path of said directed light for receiving said directed light, said first portion for splitting said received light into a first beam propagating along an optical path of said received light and a second beam being directed in a direction perpendicular to said optical path of said received light, said second portion for splitting said first beam into a third and a fourth beam which propagate respectively in two directions different from each other, for increasing the intensity of said third beam and at the same time decreasing the intensity of said fourth beam, the intensities of said third and fourth beams determined by the magnitude of said p-polarized component of said received light, and for converging separately said third and fourth beams; and reproducing means for reproducing binary data corresponding to information in said photo-magnetic disk, said reproducing means using the relative intensities of said converged third and fourth beams.

9. An optical head device according to claim 8, in which said first portion includes a second polarization beam splitter, said second portion includes a beam splitting diffraction grating, and said beam splitting diffraction grating includes two diffraction gratings arranged adjacent to each other on a surface, from which said first beam emerges, of said second polarization beam splitter, and having curved gratings so as to produce a converging action.

* * * * *